United States Patent [19]

Pinkerton et al.

[11] 3,767,093

[45] Oct. 23, 1973

[54] MANUALLY OPERATED VEHICLE MOUNTED GUN LOCK

[76] Inventors: Martin L. Pinkerton, P.B. Box 362; Oscar J. Duderstadt, both of Junction, Tex. 76849

[22] Filed: Nov. 26, 1971

[21] Appl. No.: 202,103

[52] U.S. Cl............ 224/1 R, 224/42.45 R, 211/64, 248/203
[51] Int. Cl............................................ B60m 11/00
[58] Field of Search ........... 224/1 R, 29 R, 42.45 R, 224/42.42 R; 211/64, 8, 9; 248/203

[56] References Cited
UNITED STATES PATENTS
3,326,385  6/1967  Pinkerton et al. .............. 224/1 R X
2,667,274  1/1954  Diebold ................................ 211/64
2,946,452  7/1960  Caloiero et al. ................... 211/64 X Primary Examiner—Gerald M. Forlenza
Assistant Examiner—Jerold M. Forsberg
Attorney—Harvey B. Jacobson

[57] ABSTRACT

For use on a motor vehicle or the like, at least one readily applicable and removable gun holder. Each holder is characterized, broadly stated, by an adapter unit capable of being accessibly mounted on a predetermined area of the vehicle. A bracket is superimposed and fixed on the adapter unit and is provided with at least one upwardly opening U-shaped stirrup for reception and retention of the stock of the gun. A complemental shackle is provided and has a journal pivotally mounted in bearings provided therefor in walls of the adapter. The other end is provided with a hook for retentively but releasably coacting with the stirrup, that is, in a manner to seat and safely retain the gun stock within the confines of the stirrup. A key controlled lock is operably confined within a hollow portion of the adapter. Then too, securing and releasing means is cooperatively associated with the key controlled lock and journal, respectively, for controlling the pivotal movement of the journal.

6 Claims, 4 Drawing Figures

MANUALLY OPERATED VEHICLE MOUNTED GUN LOCK

This invention relates to certain new and useful improvements in a vehicle supportedrack which is expressly designed and structurally adapted to retentively but accessibly support one or more guns and which is characterized by manually actuated lock controlled gun holding means.

Many and varied types and styles of gun racks have been devised and offered for use to serve the purposes of hunters and sportsmen but for one reason or another appear not to have met with widespread endorsement or use. It follows that it is an object of the present invention, stated generally, to advance the art of vehicle mounted gun racks and, in so doing, to better and more successfully serve the purposes of inventions in this category of endeavor.

For background purposes the reader, if so desired, may take into account and evaluate the gun rack revealed in U.S. Pat. No. 2,946,452 granted to John Caloiero et al. and which has a general bearing provided with a plurality of simultaneously actuatable openable and closable latches. A similar adaptation which also uses pivoted latches is disclosed in Raymond V. Hart U.S. Pat. No. 3,477,587.

It is an object of the present invention to improve upon the above-mentioned prior patents and other prior art adaptations and, more particularly, on our prior U.S. Pat. No. 3,326,385 which, briefly stated, comprises a rifle rack including locking levers selectively movable over the rifle receiving hooks and functioning to lock the rifles in the seated or cradled rack. This patented invention, unlike the present invention, embodies electrically operated locking means.

Briefly, the herein disclosed similar to prior art adaptations, lends itself to effectually reliable use on a stationary support surface of a motor vehicle. It has to do with a manually usuable wholly mechanical holder for at least one readily applicable and removable gun. More specifically, a satisfactorily performing construction utilizes an adapter unit so designed and constructed that it is capable of being rigidly and accessibly mounted on a selected area of the support surface. A bracket is mounted on the adapter and is provided with at least one stirrup for reception and retention of the stock of a gun. A complemental shackle is provided and has a journal at one end pivotally mounted in bearings provided therefor on the adapter. It also has a latching hook at the other end retentively but releasably coacting with the stirrup in a manner to seat and safely retain the gun stock within the confines of the stirrup. A key controlled lock is mounted on the adapter and securing and releasing means is cooperatively associated with the lock and journal, respectively, in a manner to control the pivotal movement of the journal.

Stated somewhat more explicitly the adapter takes the form of a hollow sleeve, the hollow portion of the sleeve providing a housing. The key controlled lock embodies an encased barrel projecting into the confines of the housing, a portion of the journal being enclosed and having a keeper notch. A slide is provided and has a lug fixed thereon in alignment with and is selectively seatable in the keeper seat in a manner to either permit or prevent pivotal movement of the journal. In addition, an operating connection is provided between the locked barrel and the oriented lug.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
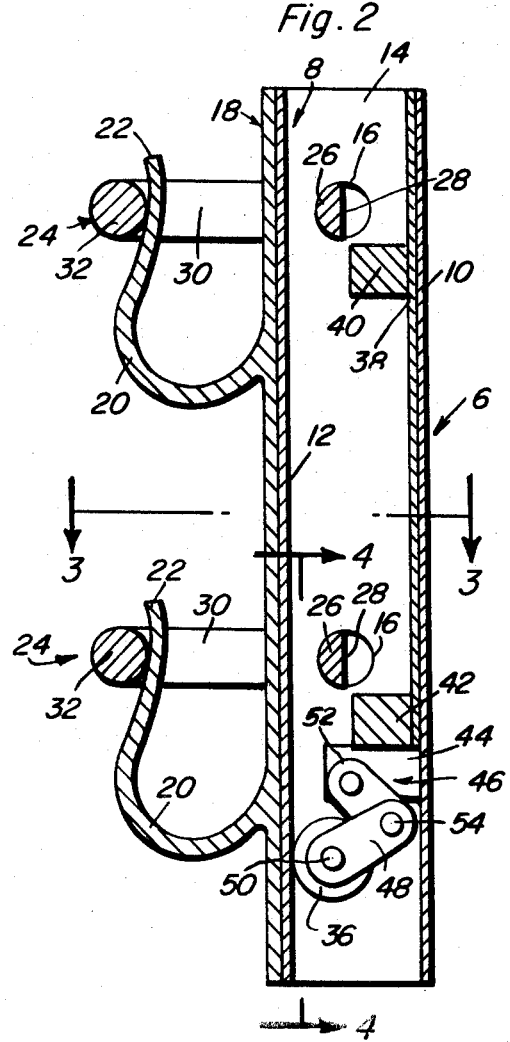
FIG. 2 is an enlarged detail view with parts in elevation taken approximately on the plane of the vertical section line 2—2 of FIG. 1 looking in the direction of the indicating arrows.
Figure 3:
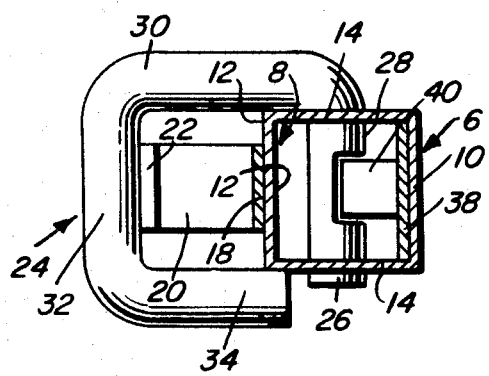
FIG. 3 is a horizontal section on the plane of the section line 3—3 of FIG. 2.

The aformentioned adapter comprises a vertically elongated hollow sleeve 6 which is herein shown (FIG. 2) as open at upper and lower ends but which may, of course, be satisfactorily closed in any appropriate manner (not detailed). The hollow portion of this sleeve constitutes an appropriate housing 8. The sleeve is substantially rectangular in cross section and embodies a suitably attachable back or rear wall 10, opposed spaced parallel front wall 12 and connecting side walls 14. This sleeve is vertically elongated and is adapted to embody means for supporting two guns or rifles as at A and B in FIG. 1. The construction may be such as to accommodate but a single gun or rifle or more than two as can be appreciated. For the purposes of accommodating the stock portions C of the guns A and B the upper and lower portions of the side walls 14 are provided with properly paired and aligned bearing holes or bearings 16 (FIG. 2). The exterior surface of the front wall 12 is provided with a bracket 18 which is such in construction that it is superimposed on the surface and approximately welded or otherwise joined thereto. The bracket has means for supporting both of the aforementioned guns or rifles A and B but for simplification of description it is pointed out that the bracket is provided with at least one outwardly opening hook or stirrup 20 or, alternatively, a pair of upper and lower stirrups. The bill portions 22 are appropriately contoured and each thus constructed stirrup serves to accommodate the companion or complemental pivoted shackle 24. This shackle is of the construction shown best in FIG. 3 wherein it will be observed that one end portion is fashioned into and provides a journal 26 which extends through and is journaled for operation in the associated bearing holes 16. As is further evident in FIG. 3, that portion of the journal which is situated within the confines of the hollow portion of the sleeve has a notch 28 therein providing a keeper seat. The major portion of the shackle comprises a hook having component portions 30, 32 and 34. The terminal of the portion 34 constitutes a bill portion and terminates beyond the front wall and in fact engages a coacting exterior surface of the side wall of the sleeve to prevent unauthorized access to the aforementioned stirrup 20. It follows that this thus constructed and mounted shackle lends itself to openable and closable use in association with a hook or stirrup 20 in the manner illustrated particularly in FIGS. 1 and 3, respectively. It is evident too that the receiver portion of the stirrup serves to accomodatingly seat and retain the stock of the associated gun, that is when the stirrup is open after which the latch-like shackle is put into play to serve its stock holding and latching function (FIG. 1).

Figure 4:
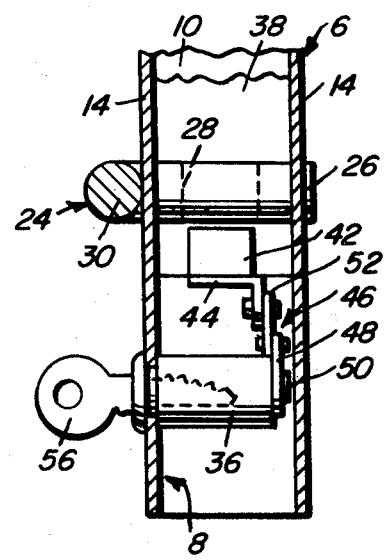
FIG. 4 is a similar sectional and elevational view fragmentarily shown and taken on the plane of the vertical section line 4—4 of FIG. 2.

A key controlled lock has an encased barrel 36 properly mounted within the confines of the hollow portion of the sleeve in a position below the plane of the associated journal. Securing and releasing means is cooperatively associated with the lock and journal, respectively, for controlling the pivotal movement of the journal. In carrying out this aspect of the concept an elongated rectangular plate 38 is provided and is slidingly keyed within the hollow confines of the sleeve as brought out in FIGS. 2, 3 and 4. This plate is shiftably slidable on the interior surface of the back wall 10 and is provided with integral laterally disposed upper and lower lugs 40 and 42. These lugs are such in construction and arrangement that they are releasably cooperable with the keeper seats in the aforementioned journals 26 as is evident particularly in FIG. 2. An operating connection is arranged between the lock barrel 36 and the associated lower lug 42 as brought out in FIGS. 2 and 4. Experience has shown that a flanged clip or fixture 44 well serves the desired purpose and lends itself to use in conjunction with the toggle 46. The toggle comprises a first link 48 with one end fixed at 50 to the turntable key controlled lock barrel. A second link 52 is pivotally connected to the clip or fixture 44 and the two overlapping links pivotally joined to each other as at 54. It follows that the key controlled barrel of the encased lock comes into play when the accessible key 56 is turned in the manner suggested in FIG. 4. This is to say the key controlled means slides the plate 38 up or down and either lodges the lugs 40 and 42 in their respective keeper seats or releases the same in the manner brought out in FIG. 2.

As is evident from the views of the drawing singly and collectively construed the invention is unique in that it is manually operated, is vehicle mounted, wholly mechanical and lock controlled. It well serves the purposes for which it has been devised and perfected for use.

Figure 1:
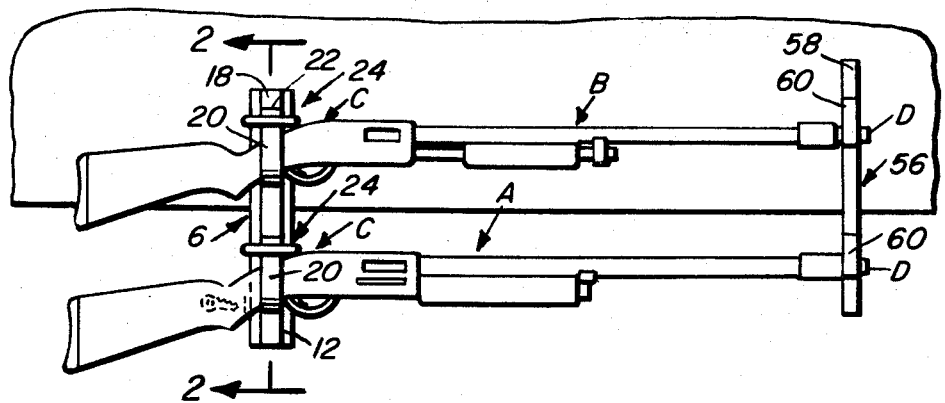
FIG. 1 is a view in side elevation showing a fragmentary portion of a wall of a vehicle or other support and showing, what is more significant, a vertically disposed gun rack at the left and complemental positioning and retaining means for the gun barrels at the right, the guns being latched and locked in place.

With further reference to FIG. 1, it will be evident that it is within the purview of the concept to provide a simple bracket for the muzzle-ends D of the gun barrels. This bracket is denoted at 56 and comprises a bar 58 having outstanding eyes 60 into which the barrel-ends are removably fitted in the manner shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention

What is claimed is:

1. For use on a relatively stationary support surface of a motor vehicle, a manually usable mechanical holder for at least one readily applicable gun comprising: an adapter unit capable of being rigidly and accessibly mounted on a given area of said support surface, a bracket mounted on said adapter unit and provided with at least one stirrup for reception and retention of the stock of a gun, a shackle having a journal at one end pivotally mounted in bearings provided therefor on said adapter unit and a latching hook at the other end retentively but releasably coacting with said stirrup in a manner to seat and safely retain said stock within the confines of said stirrup, a key controlled lock mounted on said adapter unit, and securing and releasing means cooperatively associated with said lock and journal, respectively, for controlling the pivotal movement of said journal, said adapter unit comprising a hollow sleeve, the hollow portion of said sleeve providing a housing, said key controlled lock embodying an encased barrel projecting into the confines of said housing, a portion of said journal being enclosed and having a keeper notch, a slide having a lug fixed thereon in alignment with and selectively seatable in said keeper seat in a manner to either permit or prevent pivotal movement of said jorunal, and an operating connection between said lock barrel and lug.

2. The gun holder defined in claim 1, and wherein said slide comprises a plate confined and shiftably mounted in said housing, said lug being fixed on a face of said plate and projecting laterally therefrom and being adapted to fittingly seat itself in said keeper seat and release itself from the keeper seat in keeping with the selected positions of said plate, said lug being provided with a fixture, and said operating connection comprising toggle embodying links having adjacent ends pivotally connected, one link being fixedly connected with said lock barrel, the other link being pivotally operatively connected with said fixture.

3. The gun holder defined in and according to claim 2, and wherein the latching hook at the aforementioned other end of said shackle has a terminal bill portion engaging a coacting exterior surface portion of said sleeve to ensure that the latching hook effectually encompasses and prevents unauthorized access to the stirrup.

4. For use on a relatively stationary support surface of a motor vehicle, a manually usable wholly mechanical holder for at least one readily applicable gun comprising: an elongated hollow sleeve, said sleeve constituting an adapter and being adapted to be fixedly mounted on a predetermined portion of said vehicle, the hollow portion of said sleeve constituting a housing, said sleeve embodying a rear wall, an opposed front wall, and interconnecting companion side walls, said side walls having aligned holes constituting bearings, a bracket equal in length with and rigidly mounted on an exterior surface of the front wall of said sleeve, said bracket being provided with at least one upwardly opening stirrup for reception and retention of the stock of an insertable and removable gun, a rigid manually actuatable shackle having a journal at one end pivotally mounted in the bearing holes provided in said sleeve, that portion of the journal within the confines of the hollow portion of the sleeve having a notch therein providing a keeper seat, the major portion of said shackle being of hook-like construction and having one portion releasably and cooperatively engageable with an end portion of said stirrup and having a bill portion terminating beyond the front wall and engaging a coacting side wall of said sleeve to prevent unauthorized access to said stirrup, a key controlled lock having an encased barrel mounted within the confines of the hollow portion of said sleeve in a position below the plane of said journal, and wholly mechanical securing and releasing means cooperatively associated with the lock and notched journal, respectively, for controlling the pivotal movement of said journal.

5. The gun holder defined in and according to claim 4, and wherein said securing and releasing means comprises a plate slidingly keyed within the hollow confines of said sleeve, said plate being shiftably slidable on an interior surface of the back wall of said sleeve, said plate having a laterally projecting lug, said lug being selectively registrable with and seatable in said keeper seat, and an operating connection between said lock barrel and lug.

6. The gun holder defined in and according to claim 4, and wherin said securing and releasing means comprises a plate slidingly keyed within the hollow confines of said sleeve, said plate being shiftably slidable on an interior surface of the back wall of said sleeve, said plate having a laterally projecting lug, said lug being selectively registrable with and seatable in said keeper seat, and an operating connection between said lock barrel and lug, said operating connection comprising a flanged fixture fixed to and depending from said lug, and toggle means comprising a first link having one end affixed to said lock barrel, a second link pivotally connected to a coacting part of said fixture, adjacent ends of said links being overlapped and pivotally connected together.

* * * * *